United States Patent [19]

Büschelberger

[11] Patent Number: 4,890,923

[45] Date of Patent: Jan. 2, 1990

[54] APPARATUS FOR SUPERPOSING TWO LIGHT BEAMS

[75] Inventor: Hans J. Büschelberger, Kirchzarten, Fed. Rep. of Germany

[73] Assignee: LITEF GmbH, Freiburg im Breisgau, Fed. Rep. of Germany

[21] Appl. No.: 137,876

[22] Filed: Dec. 24, 1987

[30] Foreign Application Priority Data

Jul. 30, 1987 [EP] European Pat. Off. ............ 87111057

[51] Int. Cl.$^4$ .............................................. G01C 19/64
[52] U.S. Cl. .................................................... 356/350
[58] Field of Search .......................................... 356/350

[56] References Cited

U.S. PATENT DOCUMENTS

| | | | |
|---|---|---|---|
| 3,484,169 | 12/1969 | Skalski et al. | 356/350 |
| 4,514,832 | 4/1985 | Vescial | 356/350 |
| 4,582,429 | 4/1986 | Callaghan | 356/350 |

OTHER PUBLICATIONS

Macek et al., "The Ring Laser", Sperry Engineering Review, vol. 19, 1966, p. 10. FIG. 2.
Forshaw, "An Experimental Ring Laser Rotation Sensor", Proc. of Joint Conf. on Infrared Techniques, Reading Berko England, 621–623, Sep. 1971, pp. 389–396.

Primary Examiner—Vincent P. McGraw
Attorney, Agent, or Firm—Elliott N. Kramsky

[57] ABSTRACT

Apparatus, suitable for a laser ring resonator, for superposing of two light beams that interfere at an angle of divergence and form a pattern of interference fringes at an observation location. The apparatus consists of two prism parts that are cemented to one another at a common internal connecting surface. The prism parts have slightly differing base angles. A partial region of the internal connecting surface between the two partial prisms is provided with a partially-transmitting mirror coating. A non-totally-reflecting partial coating on both outer surfaces of the prism parts has a greater refractive index than the internal medium of the prism parts and covers regions of the possible first light incidence points of light beams passing through the partial prisms from specified light entrance points at the base. The two partial prisms cemented to one another are connected, on the base side, to the glass substrate of a mirror for coupling-out light.

7 Claims, 2 Drawing Sheets

APPARATUS FOR SUPERPOSING TWO LIGHT BEAMS

BACKGROUND

1. Field of the Invention

The present invention relates to apparatus for use in a device for coupling light out of a laser ring resonator. More particularly, this invention pertains to apparatus suitable for superposing a pair of light beams that interfere at an angle of divergence to form a pattern of interference fringes at an observation location.

2. Description of the Prior Art

A pair of oppositely directed light waves or beams can propagate in a closed light path in a laser ring resonator ("ring resonator") that includes three or more mirrors. In order to measure the frequency difference (generated by a non-reciprocal effect) between, the two light beams the beams must be coupled out of the resonator. The frequency difference between the light waves can then be measured by the interference pattern between the two beams. Any external effect that generates a frequency displacement between the two light sources can be detected by observation of the interference signal.

The basic structure of a conventional laser ring resonator having four mirrors (A, B, C and D) is illustrated in FIG. 1. The light paths of the (two) oppositely-propagating light waves is indicated by the dashed, closed figure LW. Two mirrors (e.g. the mirrors A and B) are partially-transmissive. A prism I, fitted to the substrate of the mirror B, is equipped, for example, with a pair of light-sensitive detectors G and H. The detectors G and H permit measurement of the intensities of the two propagating light waves, allowing maintenance of a constant light intensity level. The coupling-out of the light to measure the frequency displacement occurs at the partially-transmissive mirror A. A superposition prism E, to which a photodetector F is fitted for scanning the interference pattern resulting from superposition of the oppositely circulating light waves, is coupled to the exterior of the substrate of the mirror A.

An asymmetric prism E is generally utilized to superimpose the beams. Such a prism includes a roof angle that deviates slightly from ninety (90) degrees. As a result, the two beams traverse differing part lengths within the prism. In the event of a change in temperature, this produces phase shifts between the two light waves. As indicated by the dotted lines comprising the light path LW, one beam is deflected by total reflection at the boundary surfaces of the prism E, subjecting it to surface effects. Such effects can influence the phase of the light wave and can disturb the interference signal, causing an apparent frequency difference.

SUMMARY AND OBJECTS OF THE INVENTION

It is therefore an object of the present invention to provide apparatus for avoiding the temperature-dependent phase shifts that result from the differing part lengths found in conventional superposition devices.

It is a further object of this invention to provide apparatus for avoiding the disturbances that occur in the interference signal that result from surface effects in the superposition of a pair of light beams that interfere at an angle of divergence.

The present invention achieves the foregoing objects by providing, in a first aspect, apparatus for superposing two light beams that interfere at an angle of divergence and form a pattern of interference fringes at an observation location. Such apparatus includes two prisms, cemented to one another at a common internal connecting surface and having different base angles. Each base angle is within the range of seventy to eighty degrees and differs from one another by ten to twenty pounds of arc. An internal, light-transmitting mirror coating is provided at at least one prism part that covers partial regions of the connecting surface. A reflecting partial coating is provided at both outer surfaces of the prism parts. The partial coating has a larger refractive index than the internal medium of the prism parts and covers the regions of the possible first light incidence points of light beams passing through the prism parts from predetermined light entrance points at the base.

In a second aspect the invention provides a laser ring resonator of the type that includes at least three mirrors, one of which is partially-transmissive for coupling-out oppositely-circulating light waves and which further incorporates apparatus for superposing two light beams as described above.

The foregoing and other features and advantages of this invention will become further apparent from the detailed description that follows. Such written description is accompanied by a set of drawing figures. Numerals of the figures, corresponding to those of the written description, point to the various features of the inventor, like numerals referring to like features throughout.

DETAILED DESCRIPTION

Figure 2:
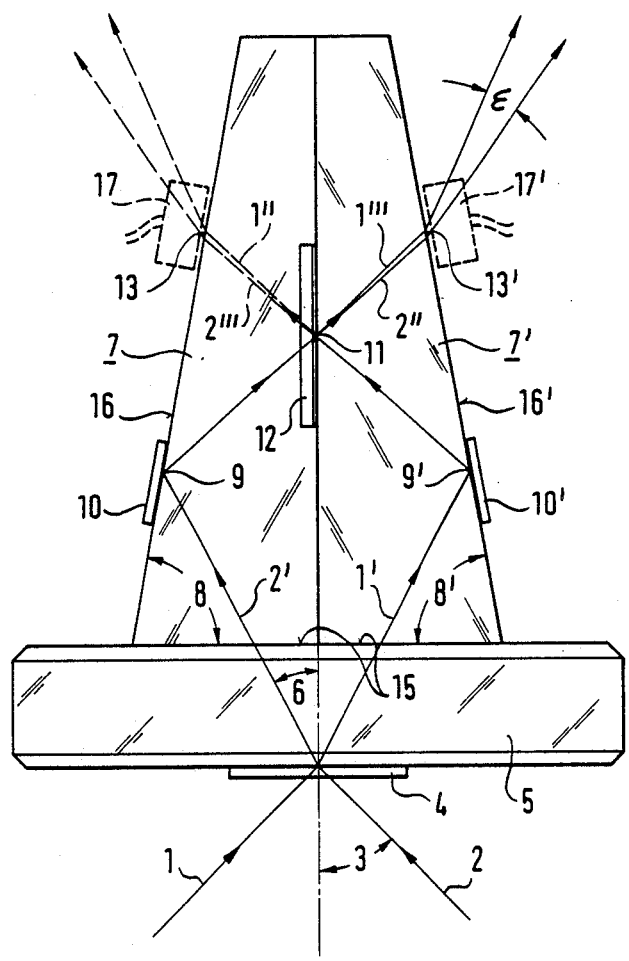
FIG. 2 is a side view of a superposition prism in accordance with the invention.

FIG. 2 is a side view of a superposition prism in accordance with the invention. As can be seen, the prism includes a pair of near-mirror image prism parts. Coupling out occurs where oppositely circulating light beams 1 and 2 strike a coating 4 of a mirror at an angle 3 to the surface normal. The transmission of the coating 4 is relatively low, permitting only a fraction of the incident light beam intensities to penetrate to the mirror substrate 5. The beams are refracted at an angle 6 to the surface normal that is dependent upon the refractive index of the material of the substrate 5.

A prism formed of two nearly identical mirror image partial prisms 7 and 7' is located on the rear surface, remote from the mirror coating 4, of the substrate 5. The prism is fitted so that the common base surface 15 is situated at the rear surface of the substrate 5. In the event that the prism 7, 7' is formed of the same material as the mirror substrate 5, the angle 6 is maintained within the partial prisms 7 and 7' by the beams 1' and 2'.

As shown, the partial prisms 7, 7' may preferably have the surface of intersection of a rightangled triangle with the apex truncated. Other embodiments of the unused part of the prism are freely selectable. For example, the branching-off of the external surfaces 16 and 16' between the positions marked by the reference symbols 9 and 13 or 9' and 13' is possible, provided that the positions of branching-off are of equal size.

The base angles 8 and 8' of the prism parts 7 and 7' arc preferably within the range of seventy (70) to eighty (80) degrees. In the event the base angles 8 and 8' differ by ten (10) to twenty (20) seconds of arc, fringe spacing of the interference signal, explained later, of approximately 5 mm will occur.

The beams 1' and 2' strike the outer surfaces of the prism parts 7' and 7 at the positions 9' and 9. In these regions, the external surfaces 16', 16 are provided with reflective coatings 10', 10, so that reflection at the denser medium, rather than total reflection, occurs. This avoids surface effects that can disturb the interference signal at the positions 9 and 9'.

After reflection at location 9 of the reflecting coating 10, the beam 2' strikes a partially-transmitting mirror coating 12 at the location 11 (the partially-transmitting mirror coating is applied, for example, to the common internal connecting surface of the two partial prisms 7 and 7' on the partial prism 7). The beam 2' is thereby split into partial beams 2" and 2"'. A similar procedure occurs with respect to the beam 1' which undergoes reflection from a denser medium at location 9' by the non-totally-reflecting coating 10' and is likewise split up into the partial beams 1" and 1"' at the partially-transmitting mirror coating 12.

An angle of divergence that is twice as large as the difference between the base angles 8 and 8' occurs both between the beams 1" and 2"' and the beams 1"' and 2". The beams 1" and 2"' and 1"' and 2" pass out of the prism parts 7 and 7' at the positions 13 and 13' respectively. The path lengths of the beams 1', 1", 1"' and 2', 2", 2"' are therefore of substantially equal lengths, so that phase shifts of the light waves due to temperature changes have the same effects and therefore do not distort the interference pattern or the measured values.

Figure 1:
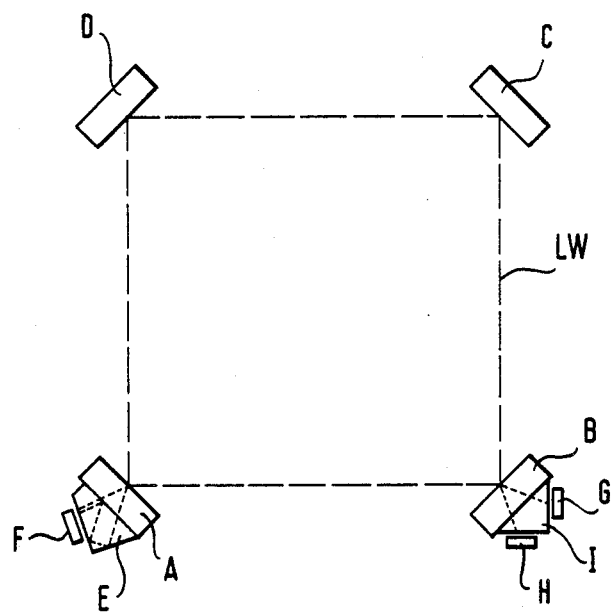
FIG. 1 is a schematic diagram of a conventional laser ring resonator in accordance with the prior art.

The angle of divergence in air is $$\epsilon = 2\delta n$$

where the refractive index of the prism material is designated by n and the difference of the base angles 8 and 8' is designated by $\delta$. As a result of the superposition of the divergent light beams after emergence from the prism parts 7, 7' in the regions 13 and 13' respectively, two interference patterns are formed, each having a fringe spacing defined as:

$$y = \lambda/\epsilon$$

Where $\lambda$ designates the wavelength of the light. The interference pattern in the region 13' can be scanned, in a well known manner by a photodetector 17' to evaluate the frequency shift in the case of a rotary movement. If, on the other hand, the interference pattern emerging from the other partial prism 7 at the position 13 is recorded with a light-sensitive detector that has a surface which averages the interference pattern over at least one period, then such signal can be employed to measure the total intensity of the two counterpropagating light beams. This intensity information is generally used to regulate the extent of the light path in the ring resonator to a predetermined value. A separate arrangement for measuring intensity, as provided by the prior art laser ring resonator of FIG. 1 at the mirror B, becomes unnecessary as a result of the light beam superposition device the invention. In particular, an additional partially-transmissive mirror is required to permit a further coupling-out of the beams. As such, lower total losses are imparted to the ring resonator. The quality of the overall laser ring resonator is therefore substantially increased by the invention.

Any optical glass as well as a glass ceramic such as those marketed, for example, under the trade names "Zerodur", "Cervix" or "Cryston-Zero", are suitable as production materials for the partial prisms 7, and 7'. The refractive index of Zerodur for red light, for example, is approximately n=1.54.

Optical fine cements, such as that marketed under the trade name "Kanadabalsam" (Canada balm) or, alternatively, prehardenable epoxide fine cements, are suitable for cementing the partial prisms 7 and 7'. The reflecting coatings 10 and 10' may, for example, be metal coatings consisting of silver or aluminum. The partially-transmitting coating 12 is preferably a fifty (50) percent beam splitter, consisting of a thin metal or multiple dielectric coatings, such as those known and used for beam splitters in the pertinent optical technology. Silicon PIN diodes may be preferably, but not necessarily, employed for the photodetectors 17 and 17'.

Thus it is seen that the present invention provides apparatus for avoiding the temperature-dependent phase shifts that result from the differing part lengths of conventional superposition devices. The differing path lengths of the beams 1 and 2 that occur in prior art devices produce temperature-dependent phase shifts that falsify the resultant measurements, Further, the surface effects that are observed to cause undesired frequency shifts in prior art devices are also avoided by the light beam superposition device of the invention. Since information is available at the prism parts 7 7' with respect to both frequency shift and intensity, a further partially-transmissive mirror is unnecessary, reducing the losses of the ring resonator and improving quality markedly.

While this invention has been illustrated with respect to a presently-preferred embodiment, it is not so limited. Rather it is only limited insofar as defined by the following set of claims and includes all equivalents thereof.

What is claimed is:

1. Apparatus for superposing two light beams that interfere at an angle of divergence and form a pattern of interference fringes at an observation location comprising, in combination:
    (a) two prism parts, said parts being cemented to one another at a common internal connecting surface and having slightly different base angles, each base angle being within the range of seventy to eighty degrees and differing from one another by ten to twenty seconds of arc;
    (b) an internal, light-transmitting mirror coating covering partial regions of said connecting surface at at least one of said prism parts; and
    (c) a reflecting partial coating at both outer surfaces of said prism parts, said partial coating having a larger refractive index than the internal medium of the prism parts and covering the regions of the possible first light incidence points of light beams passing through the prism parts from predetermined light entrance points at said base.

2. Apparatus as defined in claim 1 wherein said prism parts are of the same glass material.

3. Apparatus as defined in claim 1 wherein said apparatus prism parts are cemented, on the base side, to a common glass substrate.

4. Apparatus as defined in claim 3 wherein said glass substrate consists of the same material as said prism parts.

5. Apparatus as defined in claim 4 wherein said glass substrate is provided with a partially-transmitting mirror coating on the surface remote from said base.

6. In a laser ring resonator of the type that includes at least three mirrors, one of said mirrors being partially-transmissive for coupling-out oppositely-propagating light waves, the improvement comprising:
(a) apparatus for superposing two light beams that interfere at an angle of divergence and form a pattern of interference fringes at an observation location, said apparatus including (i) two prism parts, said parts being cemented to one another at a common internal connecting surface and having slightly different base angles, each base angle being within the range of seventy to eighty degrees and differing from one another by ten to twenty seconds of arc; (ii) an internal, light-transmitting mirror coating covering partial regions of said connecting surface at at least one of said prism parts; and (iii) a reflecting partial coating at both outer surfaces of said prism parts, said partial coating having a larger refractive index than the internal medium of the prism parts and covering the regions of the possible first light incidence points of light beams passing through the prism parts from predetermined light entrance points at said base.

7. A laser ring resonator as defined in claim 6 further characterized in that:
(a) a first photodetector for measuring the relative frequency change between said oppositely-circulating light waves within the ring resonator is disposed on the outer surface of one partial prism opposite said partially-transmitting mirror coating; and
(b) a second photodetector for measuring the mean value of the intensity of the emerging interference pattern for determining and regulating the light intensity in the ring resonator is disposed on the outer surface of said other partial prism.

* * * * *